Figure 1A:
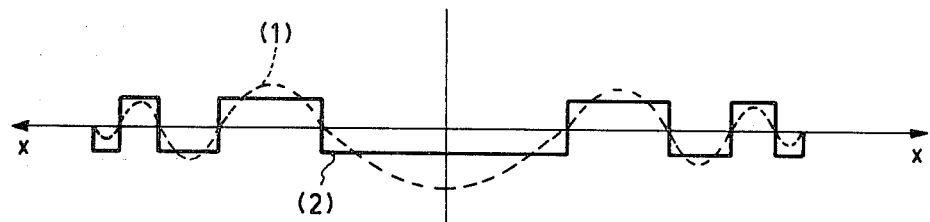

United States Patent [19]
Alais et al.

[11] 4,112,411
[45] Sep. 5, 1978

[54] DEVICE FOR ECHOGRAPHY BY MEANS OF FOCUSSED ULTRASONIC BEAMS

[75] Inventors: Pierre Alais, Dampierre; Michel Joseph Auphan, Paris, both of France

[73] Assignee: U.S. Phillips Corporation, New York, N.Y.

[21] Appl. No.: 748,691

[22] Filed: Dec. 9, 1976

[30] Foreign Application Priority Data
Dec. 11, 1975 [FR] France .................. 75 37929

[51] Int. Cl.² .............................................. G01S 9/66
[52] U.S. Cl. ................................. 340/1 R; 73/626
[58] Field of Search .......................... 340/1 R, 5 MP; 73/67.8 S, 67.9, 626

[56] References Cited
U.S. PATENT DOCUMENTS
3,675,472  7/1972  Kay et al. .................. 73/67.9 X Primary Examiner—Richard A. Farley
Attorney, Agent, or Firm—Frank R. Trifari; Bernard Franzblau

[57] ABSTRACT

A device in which focussed ultrasonic beams are used by way of binary distribution of the phase of the signals occurring in a mosaic of transducers. The material of which the transducers are made can be polarized, which enables the prefocussing of the ultrasonic beam to be transmitted or received, and also enables point-wise scanning and scanning by double focussing according to the X-direction and the Y-direction.

14 Claims, 8 Drawing Figures

DEVICE FOR ECHOGRAPHY BY MEANS OF FOCUSSED ULTRASONIC BEAMS

The invention relates to a device for echography comprising a mosaic of ultrasonic transducers arranged in N rows and M columns for transmitting ultrasonic vibrations and for receiving and converting these vibrations into electrical signals after reflection by a surface to be examined. The ultrasonic vibrations are transmitted and received as focussed beams by operating selected transducers in phase or in phase opposition in accordance with predetermined rules laid down in a focussing diagram.

Devices of this kind are known which utilize a network of elementary transducers in one plane and in which an ultrasonic beam transmitted by or to the transducers is focussed by a suitable choice of the phase of the signals occurring in the various transducers. This choice results in a focussing diagram and is approximated by the following formula:

$$p(xt) = P_o \cos[(\pi x^2/f\lambda) - \omega t] \quad (1)$$

Wherein:
$p$ is the pressure in the liquid medium in which the ultrasonic waves propagate,
$\omega$ is the angular frequency,
$\lambda$ is the wavelength,
$x$ is the coordinate of the transducer in accordance with the X-axis, and
$f$ is the distance between the plane of the transducers and the focus.

In accordance with the formula (1), the phase of the emitted vibrations continuously varies as a function of $x$. A suitable approximation of this situation is obtained when the phase varies step-wise as a function of $x$ between two feasible states (0 and $\pi$). This is given by the formula $$p(x,t) = P_o S(y) \cos \omega t \quad (2)$$

in which
$$y = \cos(\pi x^2/f\lambda)$$

where
$$S(y) = +1 \text{ for } y \geq o = -1 \text{ for } y < o$$

or alternatively
$$S(y) = +1 \text{ for } y > 0 = o \text{ for } y = o = -1 \text{ for } y < o$$

The focussing effect thus obtained in the ultrasonic domains may be assumed to be fully equal to the well-known directional effect which occurs in the electromagnetic domain when de-phased signals are applied to antenna networks formed by aligned elements.

Using the described devices, an object or an organ can be examined in a plane which is situated at a distance $f$ from the transducers. The entire object is successively scanned by displacement of the network of transducers.

One of the solutions for realising a scan of this kind consists in the use, at least for transmitting, of strip-shaped transducers whose longitudinal axes extend in parallel and are situated in one plane which is parallel to the plane to be examined and which is situated at a distance $f$ from this plane. As a result, a line-shaped focus is obtained which is parallel to the strip-shaped transducers. When the network of transducers is shifted perpendicularly to the longitudinal axes of the transducers, the line focus is shifted parallel to itself so that the plane to be examined is scanned.

The described device is disclosed in an article by Fraser et al, "A two dimensional electronically focussed imaging system", IEEE 1974 Symposium Proceedings (page 19).

The U.S. Pat. No. 3,911,730 also describes a device of the kind set forth.

This device comprises a network of N elementary transducers, N being larger than $n$ which is the number which corresponds to the opening angle chosen for the focussed beam. The device further comprises a digital shift register which comprises N positions, each position being assigned to a given transducer, the information present in $n$ positions of this register forming a representation of the focussing diagram and determining whether the signals occurring in the transducers are transferred in phase or in phase-opposition.

As in the device described in the said article during transmission focussing is successively effected on a number of lines which are parallel to the rows of the mosaic. During reception, focussing takes place on the lines which are parallel to the columns.

Thus, due to the focussing means used, determined by the nature of the transducers, only simple focussing occurs for reception as well as transmission, i.e., in the Y-direction for transmission and in the X-direction for reception.

The main object of the invention is to enable double focussing in the X- and Y-directions. The invention thus provides a device which offers the advantage of substantially improved resolution in comparison with that of the existing devices. Moreover, the invention comparatively simply enables mitigation of the restrictions resulting from a line focus in a plane parallel to the plane of the mosaic.

To this end, the device in accordance with the invention is characterized in that the transducers are made of a material which can be brought into either one of two characteristic states by prepolarisation, the phase of an electrical signal corresponding to an ultrasonic wave depending on the state obtained by the transducer by prepolarization. The device comprises means for prepolarizing transducers selected from a group of $n$ rows or columns ($n < $ N or M) of transducers according to a predetermined prepolarization diagram so that certain preselected rows or columns of transducers are prepolarised in the one state while others are prepolarised in the other state so that the ultrasonic waves transmitted or received by these rows or columns together form a prefocused beam with a line focus which is situated in a predetermined position.

When use is made of a transducer mosaic whose signals are processed according to rows or columns, i.e., when the prefocussing determines a line focus in advance, it will be obvious that on this line focus, being parallel, for example, to the rows of the mosaic, a given point focus can be determined by processing the electrical signals transferred on $n$ columns in phase or in phase-opposition in accordance with the formula (2). Thus an approximation is obtained of the spatial Fresnel transform by the combination of two linear transforms in accordance with the X-axis and the Y-axis. The double focussing point is situated at the intersection of the centers of the prefocussing diagram (determined by the prepolarisation) and the focussing diagram (determined by the processing of the signals). It appears that a complete image can be obtained by scanning because a shift of the said diagrams over one row or over one column causes the shifting of the double focussing point over one elementary step in the X-direction or in the Y-direction.

Thus, the material chosen should be prepolarisable and suitable for the transmission and reception of ultrasonic waves.

A preferred embodiment of the device in accordance with the invention is characterized in that the transducers are made of a ferroelectric and piezoelectric material.

If a third polarization state (0) is desired besides the two said prepolarization states (+ and −), it is advantageous to use a material having electrostrictive properties. An advantage of a material having three prepolarization states is that the opening angle of the focussed beam may be smaller so that the system is less susceptible to interference.

Figure 1B:
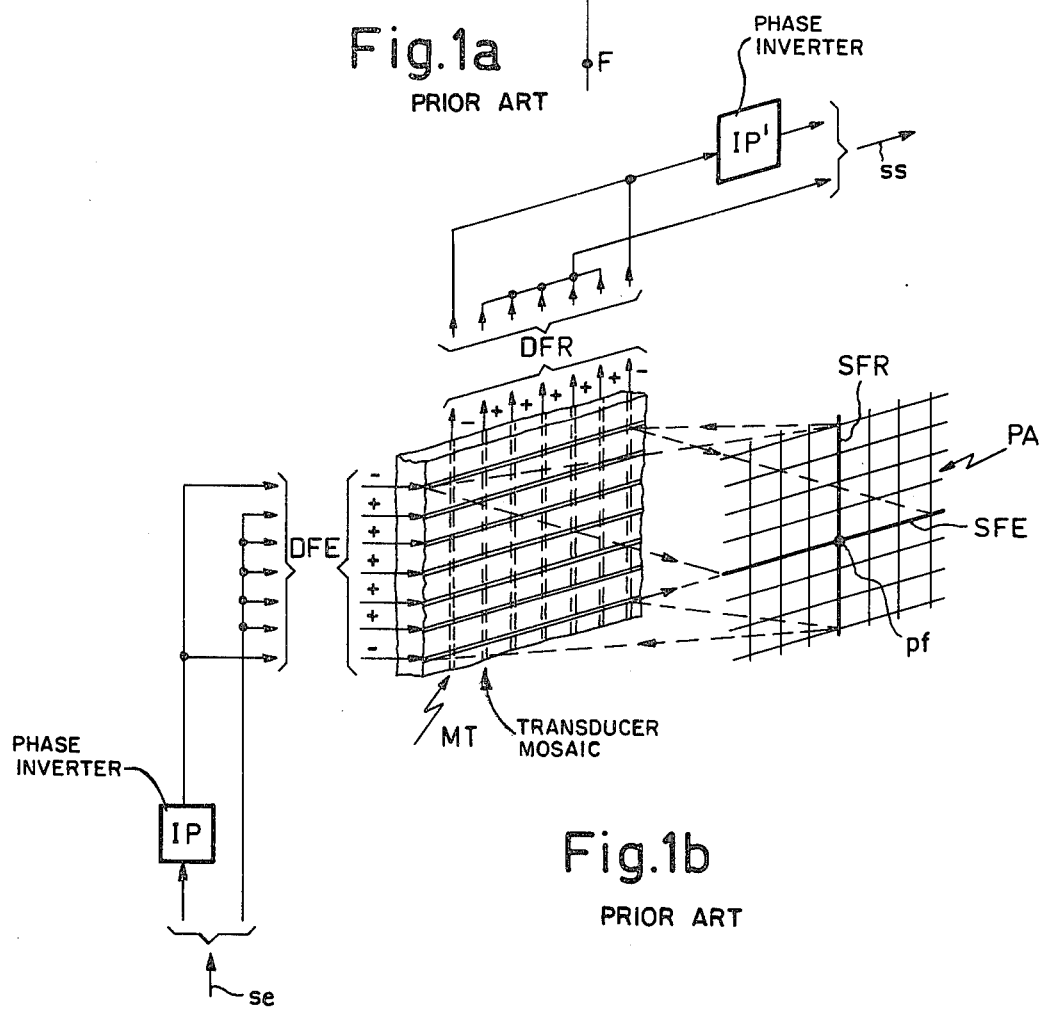
Figure 2:
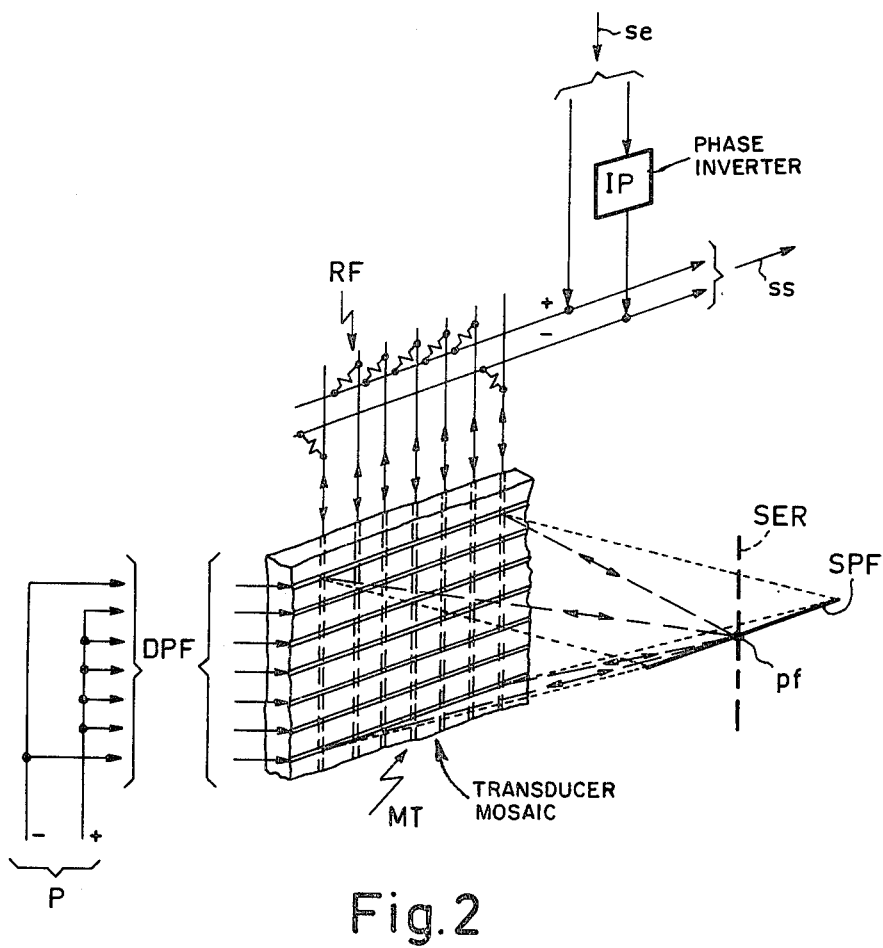

The invention will be described in detail hereinafter with reference to the accompanying drawing, in which:

FIGS. 1A and 1B diagrammatically show the operation and the construction, respectively of a known device, FIG. 2 diagrammatically shows the construction of a device in accordance with the invention, and FIGS. 3A to 3E show a diagram of the control and signal processing circuits of an embodiment of the device in accordance with the invention.

The broken line in FIG. 1A represents the said expression (1) the non-interrupted line represents the expression (2), assuming that the transducers are situated on the line XX. The focussing point is denoted by the letter F.

FIG. 1B diagrammatically shows the essential parts of a known device. The reference symbol MT denotes a (partly shown) mosaic of transducers, for example, of the type indicated in the said Patent.

During the transmission, in $n$ rows of transducers signals occur which are in phase or in phase-opposition, in dependance on the focussing diagram DFE, the input signal $se$ to the transducers being transferred either directly or via a phase inverter IP. In the plane PA to be examined (situated at a distance $f$ from the mosaic), the emitted ultrasonic beam is focussed on the line SFE (the figure shows only the seven rows of transducers which constitute the centre of the $n$ rows).

Upon reception, the signals are distributed over $n$ columns of transducers and are processed either in phase or in phase-opposition in accordance with the focussing diagram DFR (i.e., transferred directly or, for example, via a phase inverter IP') in order to form the output signal $ss$. The focussing is effected on the line SFR. Because the emitted ultrasonic beam was focussed on the line SFE, the point examined is the point $pf$ where the two lines intersect. Thus, focussing is obtained in the Y-direction during transmission and in the X-direction upon reception (the figure shows only the seven central columns of the $n$ columns of transducers).

One of the objects of the device in accordance with the invention is to obtain double focussing in the X-direction and the Y-direction, on the basis of a matrix of N.M. transducers, in order to substantially improve the resolution and possibly to eliminate comparatively simply the restrictions resulting from single focussing on a line whose points are all necessarily situated in one and the same plane. Moreover this object must be realized by means of and finally simple electronic circuits. This has been achieved by the use of prepolarisable transducers, that is to say transducers which assume one or the other of two given characteristic states under the influence of a field (possibly three states if the state "zero" is also counted). The state obtained determines the phase of the output signals of the transducers when they are directly fed with the same input signal. In a certain sense prefocussing of the ultrasonic beam to be emitted and received is thus obtained. Because, as has been demonstrated, the product of two line focussings results in a point focus at the intersection, it is sufficient to treat the emitted or received signals per column in phase or in phase opposition if the prefocussing has been performed per row (or vice versa).

FIG. 2 diagrammatically illustrates this principle and clearly shows the properties of the material chosen in accordance with the invention. This material is either piezoelectric as well as ferroelectric (suitable for prepolarization under the influence of an electric field whose intensity exceeds that of a coercive field) or electrostrictive. As in FIG. 1B, the mosaic of transducers is only partly shown, but the transducers are now made of a material having the said properties. These transducers are prepolarized in groups of $n$ rows (the figure shows only the seven central ones of the $n$ rows) by the application of either a positive or a negative pulse P in accordance with the prefocussing diagram DPF, so that the position is determined of a prefocussing line SPF in which a point to be examined, for example, the point $pf$, is situated. When electrostrictive material is used, a constant prepolarisation voltage is required during operation instead of the pulses P.

The input signals $se$ which make a contribution to the formation of an ultrasonic beam are applied to $n$ columns (the figure shows only the seven central columns), either in phase or in phase-opposition (phase inverter IP), via the focussing network RF by means of which the diagram is formed for the focussing of the beam along the line SER. The prefocussing obtained by the polarization of the transducers actually provides the focussing of the transmission beam in the point $pf$ at the intersection of the lines SPF and SER. This is also the case upon reception of an echo signal originating from the point $pf$, the signals originating from the transducers then being transferred via the focussing network RF in order to form the output signal $ss$.

Thus, in the device in accordance with the invention double focussing occurs in the X and Y-directions so that the resolution is substantially improved and ultrasonic energy is saved. In addition the control circuits can be simplified and notably the radiation to which the patient is exposed can be reduced (even though it has not been proved that the normally used ultrasonic radiation dose may be hazardous to the patient, the examination should preferably be performed with the smallest dose possible).

Moreover, due to the fact that the prefocussing of the beam is determined by the prepolarisation which only statically affects the transmission and reception process, it will be obvious that the prefocussing diagram can be comparatively simply changed in order to situate the line SPF, on which the focussing points are situated, at different distances from the mosaic formed by the transducers.

It has been stated that the transducers of the mosaic can be polarized. It has also been stated that, in accordance with the invention, these transducers either have piezoelectric and ferroelectric properties or are made of electrostrictive material. In most cases materials which are ferroelectric below the Curie point are electrostrictive above this point. In practice it has been found that most materials are only weakly electrostrictive, with the exception of the ferroelectric materials operated just above the Curie point. When the Curie point is exceeded, the piezoelectric properties disappear, but they continue to exist up to a few degrees above this point thanks to the strong electrostriction.

The material chosen for the transducers is a ferroelectric and piezoelectric or an electrostrictive monocrystal which is thus suitable for receiving and transmitting ultrasonic waves and for influencing the phase of the received or transmitted signal in accordance with the state in which it has been brought by the choice of its polarization direction. If it forms part of the first category (piezoelectric and ferroelectric), the chosen material should of course have piezoelectric properties at the operating temperature (preferably at the ambient temperature). Moreover, the following requirements should be satisfied:

it should have a weak coercive field so that it can be polarized in one or the other of the two states without expensive circuits being required, the piezoelectric axis of the material should coincide as well as possible with the corresponding direction of the electric field in order to ensure simple operation and optimum effect, the piezoelectric coupling factor of the material should correspond approximately to that of the commonly used piezoelectric ceramic materials, the relaxation period should be short so that the changeover of the material from the one to the other state and vice versa does not cause parasitic effects, and the material should be available in the form of a sheet having a comparatively large surface area.

A material which satisfies the above requirements is triglycine sulphate (TGS) which:

is ferroelectric and has a Curie temperature of 49° C, has a coercive field whose intensity amounts to approximately 300V/cm at ambient temperature, is piezoelectric and pyroelectric in accordance with the OY-axis, the displacements also occurring in accordance with this axis, has a piezoelectric coupling factor of approximately 0.25, i.e., slightly smaller than that of the titanium zirconates which lies between approximately 0.35 and 0.40, but a lower acoustic impedance (relative to water) which thus allows better adaptation to biologic tissues.

has a relaxation period in the GHz range, and can be obtained in the form of monocrystals having the dimensions 50 × 50 × 0.1 mm so that a plate of 200 × 200 mm can be formed which resonates at a frequency of 2 MHz.

Thus, the triglycinesulphate material is suitable for realising the mosaic of transducers of the device in accordance with the invention.

If a material of the second category is chosen (electrostrictive material), the operating temperature must be the temperature at which the electrostrictive effect occurs. Moreover;

the axis along which the electrostriction occurs must coincide as well as possible with the corresponding direction of the electric field, the conversion factor for converting electric energy into acoustic energy should be sufficiently high (in the order of that of the commonly used piezoelectric ceramic materials), the material must be available in the form of a sheet having a comparatively large surface area.

The relaxation time of such a material generally substantially equals zero.

Materials which satisfy the above requirements (they may also satisfy the said requirements for piezoelectric and ferroelectric material!) are, for example, triglycine sulphate (TGS) and triglycine selenate (TGSe) and generally any mixture of TGS and TGSe available as a monocrystal.

These materials:

are electrostrictive with a Curie point between 49° and 53° C are electrostrictive in accordance with the OY-axis, the displacements taking place in accordance with the same axis, have an energy conversion factor which, in the vicinity of the Curie point and for electric fields in the order of 500 to 1000 V/cm, is of the same order of magnitude as that of the ferroelectric effect below the Curie point.

All these materials satisfy the imposed requirements and are suitable for a device in accordance with the invention.

FIGS. 3A to 3E illustrate an embodiment of the device in accordance with the invention. Some parts of this device are shown in more than one of these figures, for example, the mosaic of transducers MT and the program unit P.

Figure 3A:
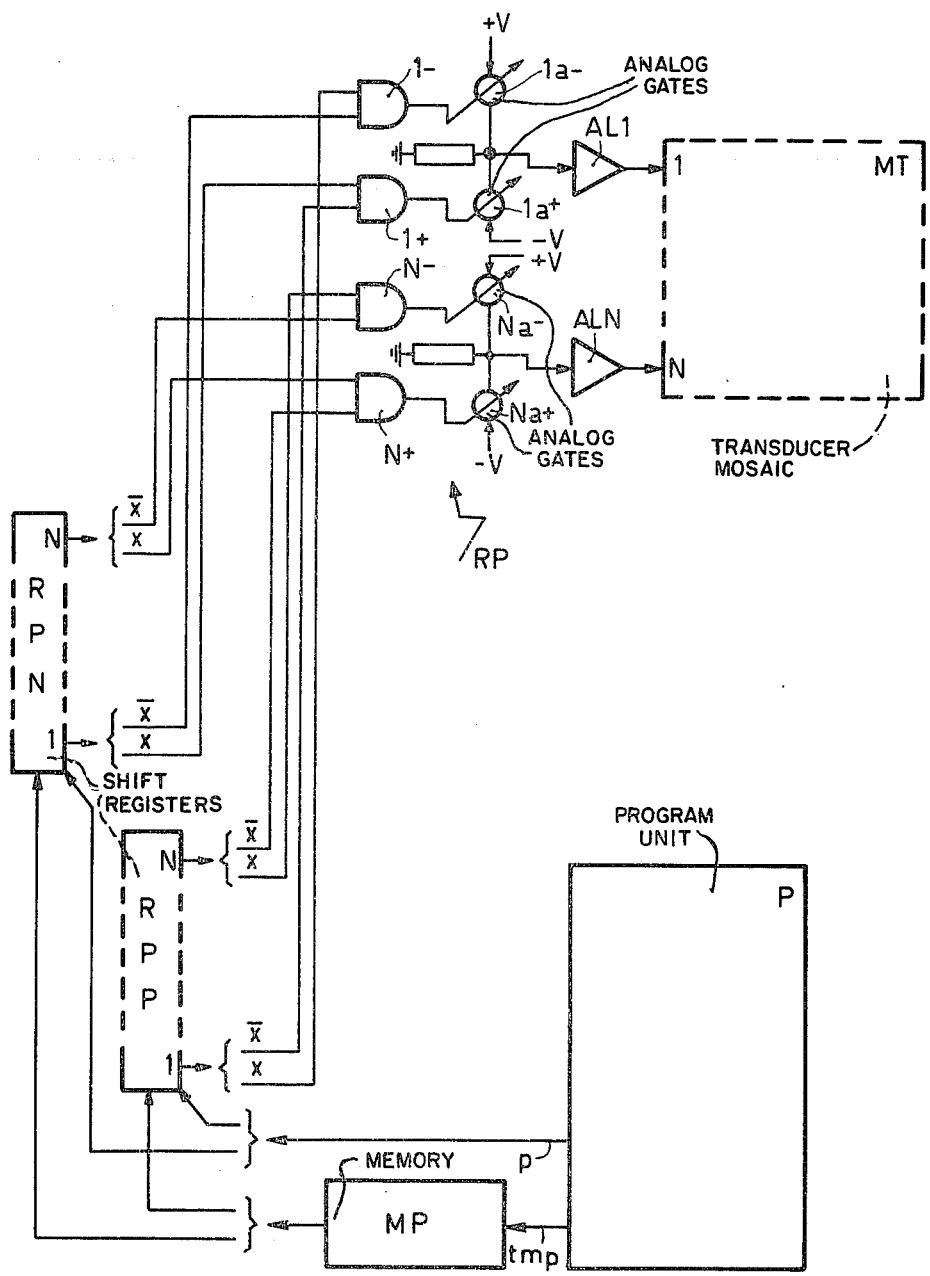

FIG. 3A diagrammatically shows the circuits which concern the prepolarization of the transducers of the mosaic MT. The transducers are prepolarised per row and the mosaic comprises N rows, only the extreme rows 1 and N of which are shown. The prepolarization circuits mainly comprise:

a memory MP in which the selected polarization diagram is stored in binary form, two shift registers RPP and RPN, each of which comprises N positions, each shift register representing at any instant the status of the polarization states imposed on the rows of transducers 1 to N.

The first shift register (RRP) offers a positive image of the polarization diagram in a sense such that each of the positions of the register in the state "1" corresponds to a positively polarized row of transducers in the corresponding position in the mosaic.

The second shift register (RPN) offers a negative image of the polarization diagram in the sense that each of the positions of the shift register in the state "1" corresponds to a negatively polarized row of transducers in the corresponding position in the mosaic. Generally, these images need not be complementary. For an arbitrary prepolarization, this arrangement enables exclusion of the irrelevant rows of transducers from the formation of the prefocussing beam by prepolarization. The foregoing is shown in the table below:

| State of positions of register RPN | State of positions of register RPP | Diagram | Rows of the mosaic and shift register positions | |
|---|---|---|---|---|
| 0 | 0 | | 1 − | 3 |
| 0 | 0 | | 1 − | 2 |
| 0 | 0 | | 1 − | 1 |
| 1 | 0 | − | 1 | |
| 0 | 1 | + | 1 + | 1 |
| 1 | 0 | − | 1 + | 2 |

-continued

| State of positions of register RPN | State of positions of register RPP | Diagram | Rows of the mosaic and shift register positions | |
|---|---|---|---|---|
| 1 | 0 | + | 1 + | 3 |
| 1 | 0 | − | 1 + | 4 |
| 0 | 1 | + | 1 + | 5 |
| 0 | 1 | + | 1 + | 6 |
| 0 | 1 | + | 1 + | 7 |
| 0 | 1 | + | 1 + | 8 |
| 0 | 1 | + | 1 + | 9 |
| 0 | 1 | + | 1 + | 10 |
| 0 | 1 | + | 1 + | 11 |
| 0 | 1 | + | 1 + | 12 |
| 0 | 1 | + | 1 + | 13 |
| 0 | 1 | + | 1 + | 14 |
| 0 | 1 | + | 1 + | 15 |
| 1 | 0 | − | 1 + | 16 |
| 1 | 0 | − | 1 + | 17 |
| 1 | 0 | − | 1 + | 18 |
| 0 | 1 | + | 1 + | 19 |
| 1 | 0 | − | 1 + | 20 |
| 0 | 0 | | 1 + | 21 |
| 0 | 0 | | 1 + | 22 |
| 0 | 0 | | 1 + | 23 |

In this table it is assumed, by way of example, that 21 rows of transducers make a contribution to the prepolarization. These are the rows 1 to 1 + 20. for each of these rows, in this example, one or the other of the two corresponding positions of the registers RPP and RPN have the state "1" as a function of the focussing diagram shown in the second line of the table and in agreement with the foregoing explanation. For all other rows of the mosaic, of which only the rows (1 − 3) to (1 − 1) and (1 + 21) to (1 + 23) occur in the table, the corresponding positions of the two registers have the state "0".

The transfer of the information stored in the memory MP to the shift registers RPP and RPN is controlled by a signal *tmp* which is supplied by the program unit P prior to each measurement. This information is shifted through the two shift registers under the control of a signal *p* which is also supplied by the program unit P.

The prepolarization circuits also contain a network RP of logic and analog gates. The said network comprises N signal paths and has its input coupled to the shift registers RPP and RPN. Its output is coupled to the N rows of the mosaic via amplifiers AL1 to ALN.

An "analog gate" is to be understood to mean herein an electronic element which either conducts an analog signal or not under the control of a logic signal applied to its control input. Examples of elements of this kind are relays and switching transistors. In FIG. 3, for example, the elements 1a−, 1a+, Na−, Na+ are analog gates.

Like all similar networks shown in the subsequent figures, the network of gates RP operates equally well when a material having two or three prepolarization states is used for the transducers.

The operation of the network RP is as follows: The polarization voltage of a row is supplied by the output of the corresponding position of either the register RRP (when a positive polarization is concerned) or the register RPN (in the case of negative polarization) or of both registers (when a polarization O is concerned). This voltage is applied by the one or the other (or both) of the AND-gates "1+" and "1−" ... N+, and N−, and subsequently to one of the two (or both) analog gates ("1a−, "1a+, ...) and further to the input of the corresponding amplifier (AL1 ... ALN).

The AND-gates "1+", "1−". . . serve to prevent the accidental occurrence of the polarizations + and − in the same row of transducers, as this would destroy the relevant circuits by short-circuiting.

Thanks to the network RP, three possible prepolarization states can be applied to the inputs of the amplifiers AL1 . . . ALN. As a result, the signal processing can be adapted better to the curve (2) of FIG. 1A. In order to take into account the positions where this curve intersects the axis XX, actually in the focussing diagram only the information must be introduced, at the locations corresponding to the intersections, which corresponds to the state 0 for the corresponding positions of the two shift registers RPP and RPN.

The advantage of such a third polarization state (the state 0) consists in that the opening angle of the focussed beam is reduced so that a smaller number of rows of transducers is involved in the focussing. As a result, interference signals (noise etc.) from the other rows are eliminated.

Moreover, the polarization state 0 can be particularly readily obtained if the transducer material consists of electrostrictive material. In that case only the applied electrical field must be switched off.

Figure 3B:
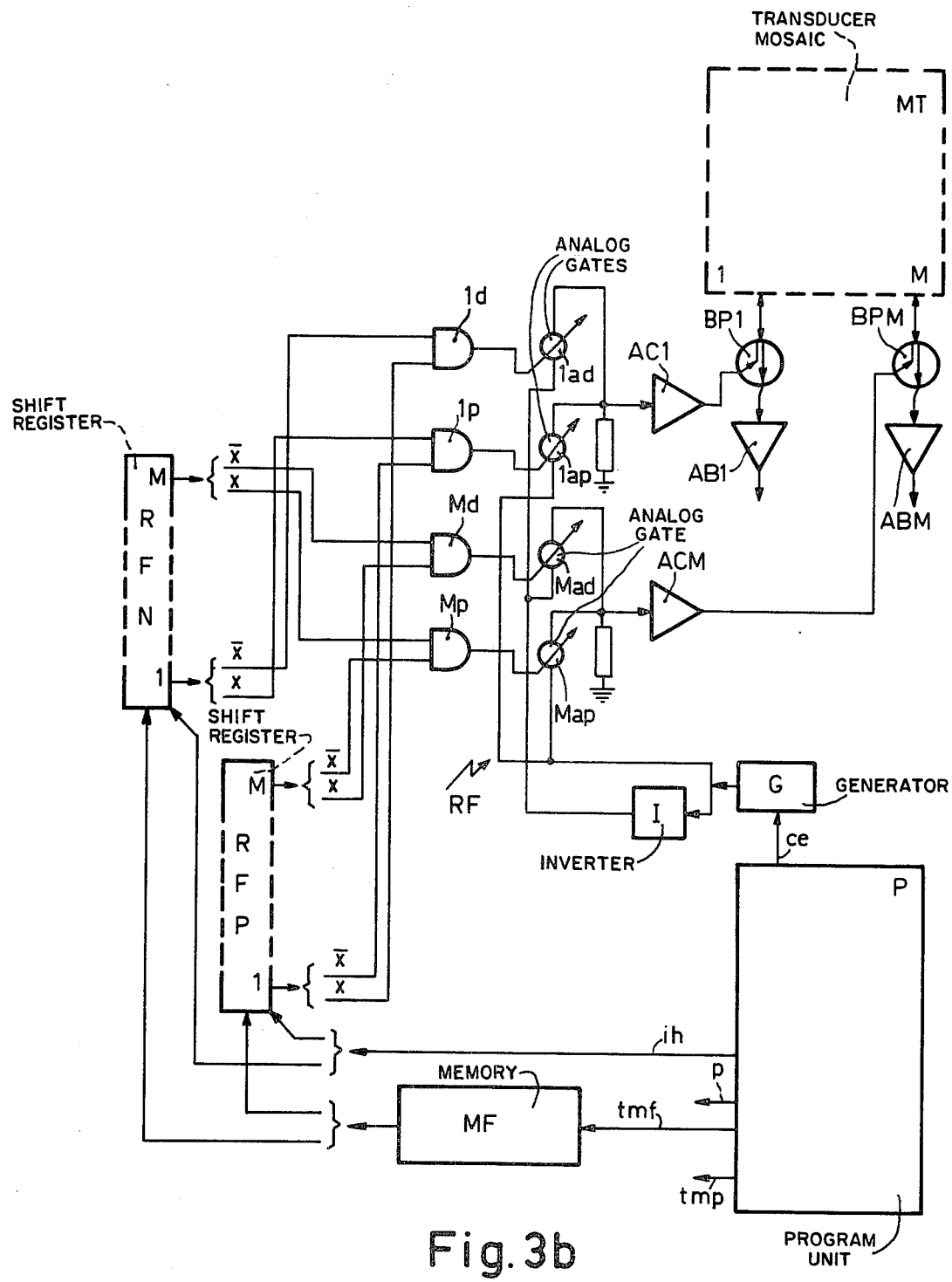

FIG. 3B shows the part of the device which relates to the transmission circuits. Again the mosaic MT is shown, as is the program unit P with the two said control signals *tmp* and *p*. The structure of the transmission circuits corresponds to that of the prepolarization circuits in the sense that the transmission circuits also comprise a memory MF and two shift registers RFP and RFN, and a network of gates RF. However, this network connects the outputs of the registers to the M columns of the mosaic. Thus, it comprises M signal paths and is adapted to transfer the pulse-like transmission signals in phase or in phase opposition, depending on the states of the positions of the shift registers. The transmission signal is formed in the generator G and is transmitted under the control of the signal *ce* which is supplied by the program unit P. The generator cooperates with a phase inverter I and the transmission signals are transferred to the columns via amplifiers AC1 . . . ACM and via two-way elements BP1 . . . BPM which are adapted to separate incoming and outgoing signals.

The memory MF inter alia contains the information which corresponds to the focussing diagram for transmission which enables, in the same manner as a diagram of the prepolarizations of the rows of transducers, a point to be selected on the line focus determined by the prepolarization.

The user has verious possibilities of utilizing the device in accordance with the invention. When a given diagram is introduced into the shift registers and the information is advanced in these registers one step after the other, for example, the user can successively focus the transmitted beam on the successive points of the line focus obtained by the prefocussing. In this case the information present in the memory MF is comparable in all respects with the information present in the memory MP of FIG. 3A, i.e., the information is present twice in order to produce a "positive image" in the register RFP and a "negative image" in the register RFN, the two images not necessarily being complementary. The write operations in the shift registers are effected under the control of a signal *tmf* which is supplied by the program unit P, whereas the successive selection of the successive points on the line focus determined by the prepolarizaton is effected by the simultaneous shifting forward of the information in the two registers under the control of a pulse *ih* which is supplied by the program unit P at the end of each transmit/receive sequence.

It is alternatively possible to focus the transmitted beam simultaneously on a number of points distributed over the line focus, which means that the shift registers contain a number of images (positive or negative) of the focussing diagram which corresponds to the number of simultaneously focussed points, for example, because the corresponding double information is stored in its entirety in the memory MF. In any case, if the "opening angle" of the focussed beam requires the excitation of *m* columns of transducers, the transmitted beam can be simultaneously focussed on M/*m* points.

Each signal path in the network of gates RF comprises four gates: two analog gates (for example, 1*ad* and 1*ap* for the signal path assigned to the column 1) which feed the signal supplied by the generator G either directly in phase or via the phase inverter I to the corresponding column, and two AND-gates for conditioning these transfes (1*p* and 1*d* in the same example). The function of these gates is the same as that of the AND-gates of the network RP of FIG. 3A.

Finally, it is to be noted that the user has a second selection possibility as regards the further program after a transmit/receive sequence:

the user can select focussing points which are situated directly adjacent the points just scanned; in this case the program unit P must supply a single pulse *ih*, or the user can select points which are situated at equal distances from the points just scanned; in this case the program unit must supply a number of pulses *ih* which is determined by this distance.

The function of the amplifiers AB1 . . . ABM will be described hereinafter.

Figure 3C:
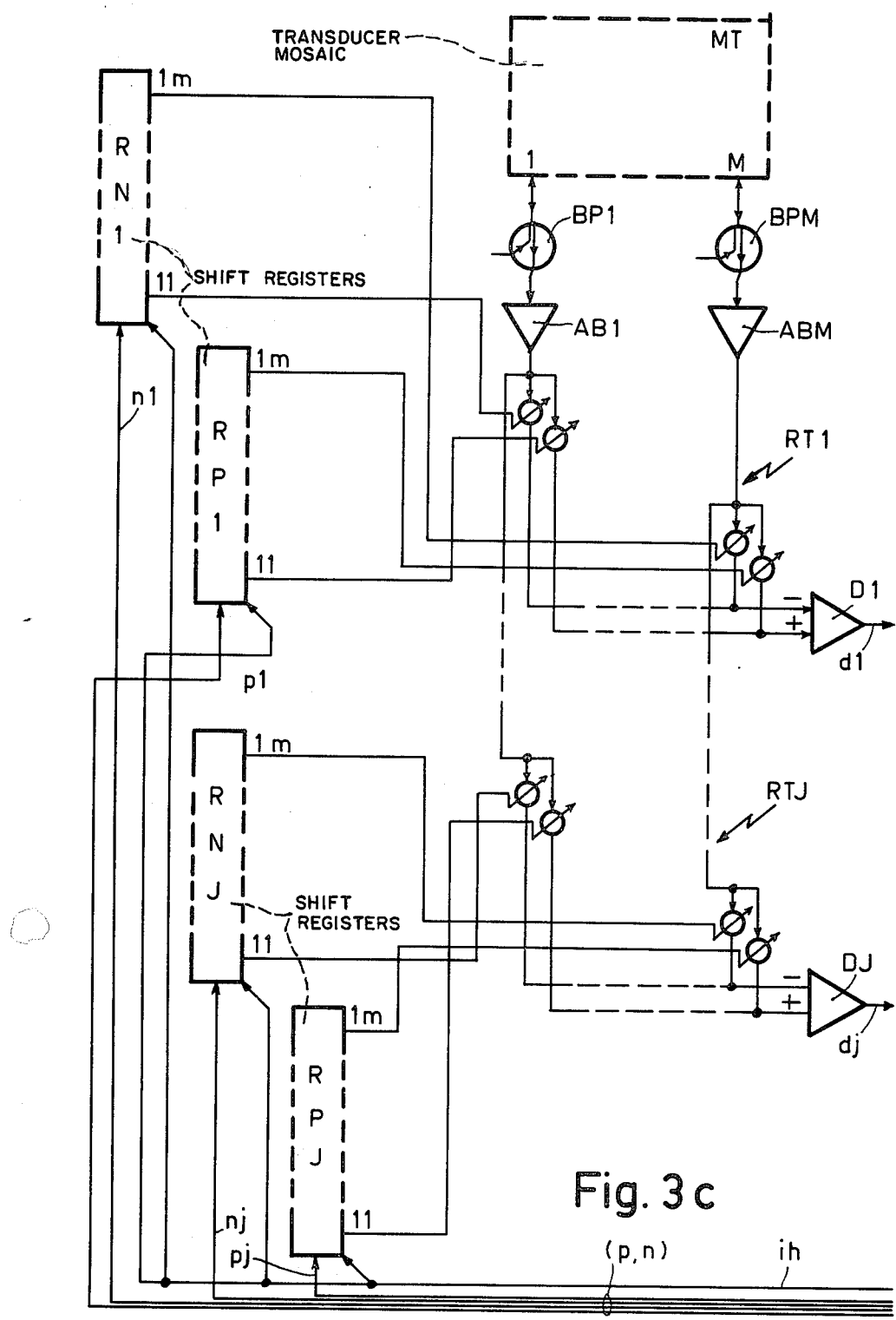
Figure 3D:
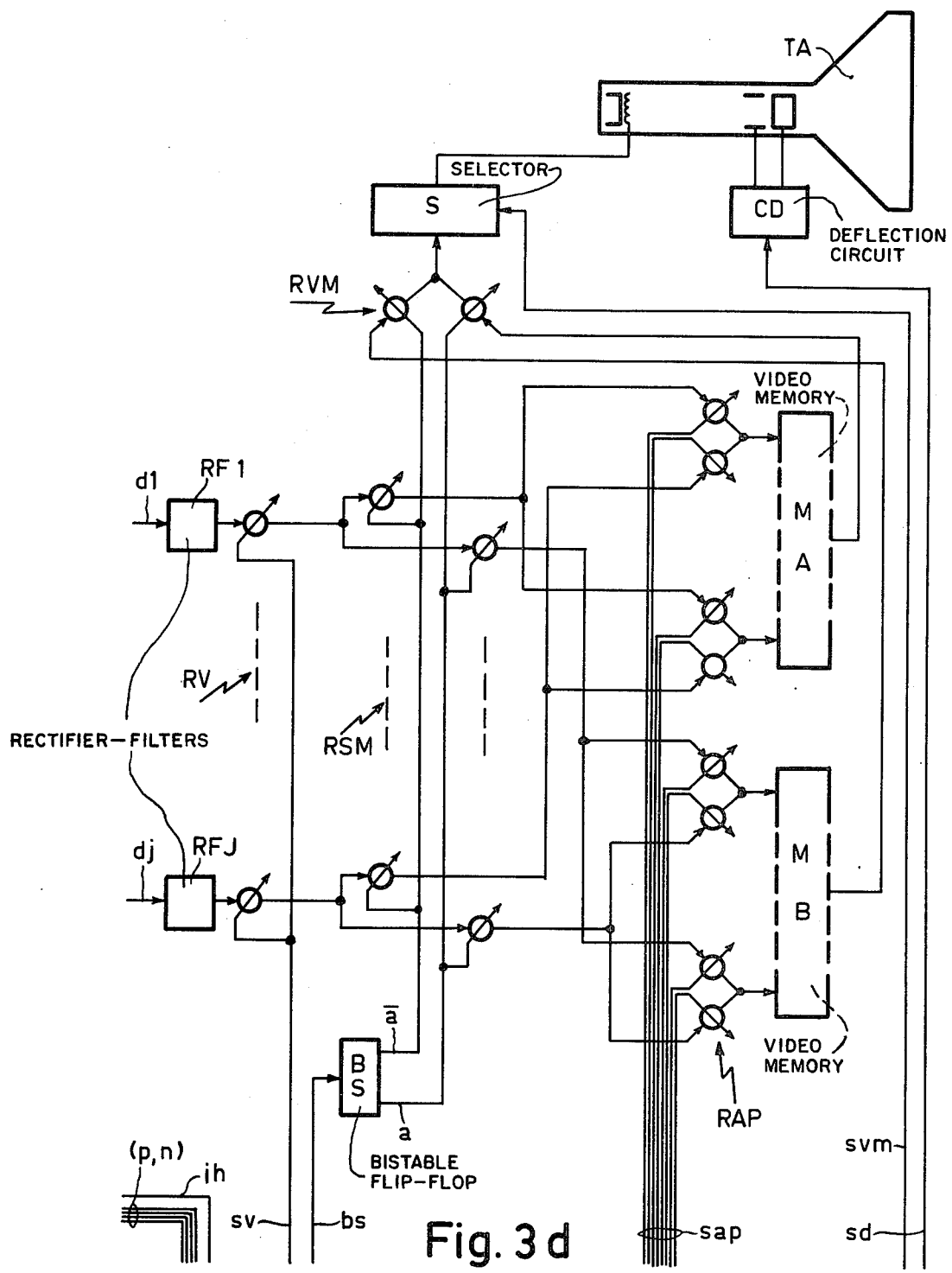
Figure 3:
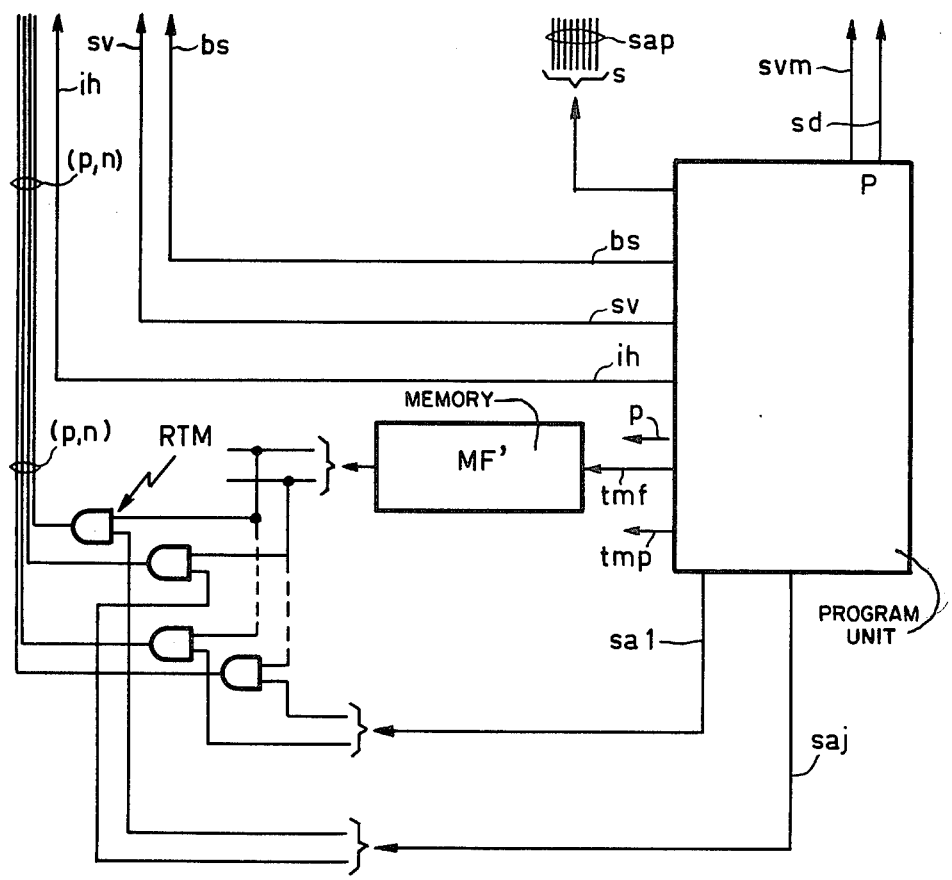

The FIGS. 3C, 3D and 3E show the receive circuits of the device which are roughly classified as focussing receive circuits (FIG. 3C), signal processing circuits (FIG. 3D) and control circuits (FIG. 3E). FIG. 3C again shows the mosaic MT formed by the transducers, the amplifiers AB1, ABM and the two-way elements BP1, BPM, while FIG. 3E shows the program unit P again.

The structure of the focussing circuits (FIG. 3C) is again comparable to that of the circuits shown in the FIGS. 3A and 3B in a sense that again use is made of a memory MF' (FIG. 3E) and shift registers which condition the transfer of the receive signals via networks of gates, but these circuits are more complex because they are adapted to the possibility of simultaneously scanning different points of the line focus. The number of points is assumed to be J in the diagrams. Thus, in principle J similar receive stages must be supplied with the echo signals which are formed in each given point and which are received for each point on *m* columns, taking into account the polarizations determined by the focussing diagram chosen for the reception.

In practice J differential amplifiers are available, for example, the amplifiers D1 and DJ, the − and + inputs of each amplifier being coupled, via the M signal paths of a network of gates (RT1 for D1, RTJ for DJ), to the output of the M amplifiers AB1 . . . ABM whose inputs are connected to the outputs of the M columns via the M two-way elements BP1 . . . BPM The transfer conditions for the gates of a network are supplied by a set of two shift registers associated with this network (RN1 and RP1 for RT1; RNJ and RPJ for RTJ), which means that the circuits comprise 2.J shift registers.

Considering a single set of two shift registers, for example, the registers RN1 and RP1, it may again be stated that these registers produce positive images (register RP1) and negative images (register RN1) of the focussing diagram for the reception, but obviously on only one of the points scanned. In this case this is the point where any echo signals are formed which are applied to the differential amplifier D1. During the scanning program, this point successively occupies different positions on the line focus, so it is desirable to leave open all transfer possibilities from the M columns of the mosaic to the said amplifier D1. The number of positions of each register RN1, RP1 equals M, and each of the M signal paths of the network RT1 comprises two analog gates, i.e., one for the conduction to the (−) input and the other one for conduction to the (+) input of the differential amplifier D1. The corresponding positions of the two registers supply transfer conditions for the two gates which form the signal path assigned to the column of the same rank as that of the positions, and this transfer is effected to the (−) input or to the (+) input of the differential amplifier in accordance with the fact whether the relevant memory position of the register RN1 or that of the register RP1 has the state"1", or to both inputs if the relevant position has the state "0" in RN1 as well as in RP1. The same reasoning is applicable to the set of registers RNJ and RPJ, the gate network RTJ and the differential amplifier DJ. It can be deduced from the foregoing that the groups of positions which determine the focussing diagram at J simultaneously scanned points in both sets of registers differ from each other, but that obviously the registers RP1 . . . RPJ and RN1 . . . RNJ together produce the same images (positive and negative) of the focussing diagram as the registers RFP and RFN of FIG. 3B. The information to be written in the 2.J shift registers can thus originate from the same memory which cooperates with the shift registers RFP and RFN. The memory MF' of FIG. 3E can therefore be the same as the memory MF of FIG. 3B. The memory MF then cooperates with the gate network RTM which comprises J signal paths, each of which comprises two AND-gates which are opened by the conditioning signals *sa*1 . . . *saj* which are supplied by the program unit P, so that the double information stored (*p*, *n*) is sucessively applied to the sets of shift registers RN1-RP1 (*n*1-*p*1) to RNJ - RPJ (*nj* - *pj*). The advancing of the information in the shaft registers of FIG. 3C takes place in synchronism with the advancing of the information in the shift registers of FIG. 3B (pulses *ih*).

The output signals *d*1 . . . *dj* of the differential amplifiers D1 . . . DJ are rectified and filtered in the circuits RF1 . . . RFJ (FIG. 3D), and applied to the input of a network RV which comprises J analog gates. These gates are opened at the instant *to* + *tr* (*to* being the instant at which the transmission takes place for the scanning of J points of the line focus, determined by the prepolarisation of the transducers, while *tr* is the response time determined by the focal distance and the propagation velocity of the ultrasonic waves in the environment used). The signal *sv* for opening the gates is supplied by the program unit P.

In the embodiment shown of the device in accordance with the invention, the receive signals are stored in a memory for line-wise display on the screen of a display tube TA, the deflection circuit CD of which is synchronized by a signal *sd* suppled by the program unit P. The display of a line coincides with the scanning of the next line. Thus, it is necessary to have available two video memories MA and MB and two conduction networks RSM and RVM comprising analog gates which are controlled by a bistable flip-flop BS, the state of which changes under the influence of the signal $bs$ supplied by the program unit:

the first network RSM conducts the receive signals to the memory MA or the memory MB when the flip-flop BS is in the state determined by the presence of the condition $a$ or $\bar{a}$, respectively, the second network RVM enables the transfer of the information present in the memory MA or the memory MB, respectively, when the flipflop BS is in the state which is determined by the presence of the condition $\bar{a}$ or $a$, respectively.

The reading of the memories is serially controlled in the conventional manner by the selector S under the influence of the signal $svm$ supplied by the program unit for the display of the information on the screen of the tube TA in the correct sequence.

The write operations in the memories MA and MB are effected in dependence on addressing signals $sap$ originating from the program unit P, which also determines the successive positions of the scanning points on the basis of a predetermined program, inter alia by means of the pulses $ih$. The signals $sap$ open the analog gates of an addressing network RAP for the transfer of the receive signals (already conducted either to the memory MA or to the memory MB) to the memory positions of the selected memory which correspond to the positions of the points scanned.

The described device is particularly suitable for medical applications when the mosaic is coupled to the patient in known manner via a water bag.

What is claimed is:

1. A device for echography comprising, a mosaic of ultrasonic transducers arranged in N rows and M columns for transmitting ultrasonic vibrations to a surface to be examined and for receiving and converting ultrasonic vibrations into electrical signals after reflection by said surface, means for operating selected transducers in phase or in phase-opposition in accordance with a predetermined program set out in a focussing diagram so that the ultrasonic vibrations are transmitted and received as focussed beams, the transducers being made of a material which can be brought into one of two characteristic states by applying a prepolarization signal thereto, the phase of an electrical signal corresponding to an ultrasonic wave being dependent upon the state obtained by the transducer by prepolarization, and means for prepolarizing the transducers selected from a group of $n$ rows or columns ($n \leq N$ and M) of transducers according to a predetermined prepolarization diagram so that certain selected rows or columns of transducers are prepolarized in the one state and others are prepolarized in the other state so that the ultrasonic waves transmitted or received by these rows or columns together form a prefocussed beam having a line focus which is situated in a predetermined position.

2. A device as claimed in claim 1, characterized in that the transducers are made of a ferroelectric and piezoelectric monocrystalline material.

3. A device as claimed in claim 1, characterized in that the transducers are made of a material having at least three feasible polarization states.

4. A device as claimed in claim 3, characterized in that the said material is monocrystalline and electrostrictive.

5. A device as claimed in claim 2 wherein the material of the transducers is selected from the group consisting of monocrystalline triglycine sulphate (TGS) or tryglycine selenate (TGSe) or a monocrystalline mixture of TGS and TGSe.

6. A device as claimed in claim 1 wherein said operating means further includes a focussing network which comprises two input/output signal paths for electric signals, in phase and in phase-opposition, for processing the electric signals which contribute to the transmission or reception of the prefocussed ultrasonic beams for each point to be examined, the said path being coupled to n successive columns or rows of the mosaic, the one signal path being coupled to P columns whereas the other path is coupled to $q = (n - p)$ columns in accordance with a predetermined pattern, so that the transmitted or received ultrasonic beam is focussed on a line which is parallel to the said columns or rows and which intersects the line focus determined by the prepolarization at the area of the point to be examined.

7. A device as claimed in claim 1 including two shift registers for selection of rows and/or columns of the mosaic of transducers and whose shiftable information corresponds to the focussing diagram, the n corresponding memory positions of the two shift registers containing the information for the prefocussing and/or the focussing of the ultrasonic beam, the positive image of the focussing diagram being produced in the first register and the negative image in the second register, means coupling the first and the second shift registers to the said rows and/or columns via a network of gates which performs the function of a prefocussing network and/or a focussing network, the prepolarization signals and/or the transmission or receive signals being transferred via the said network to a row and/or column having the rank $r$, either in phase when the memory positions having the rank $r$ of the first and second registers contain the binary information elements "1" and "0", respectively, or in phase-opposition when the said memory positions contain the binary information elements "0" and "1", respectively.

8. A device is claimed in claim 3 wherein the transducer material is selected from the group consisting of monocrystalline triglycine sulphate and triglycine selenate or a monocrystalline mixture thereof.

9. A device for ultrasonic examination of a surface comprising, a mosaic of ultrasonic transducers arranged in N rows and M columns for transmitting ultrasonic vibrations to said surface and for receiving and converting ultrasonic vibrations reflected from said surface into electric signals, means for operating selected ones of said transducers in phase and other selected transducers in phase opposition in accordance with a given program such that the ultrasonic vibrations are transmitted and received as focussed beams, the transducers being made of material having two characteristic states determinable by a prepolarization signal applied thereto whereby the phase of an electric signal corresponding to an ultrasonic wave is determined by the state produced in the transducer by the prepolarization signal, and means for selectively applying prepolarization signals to selected transducers of a group of n rows or columns of transducers so that certain rows or columns of transducers are prepolarized into one state and other rows or columns are prepolarized into the other state thereby to form a focussed ultrasonic beam having a line focus situated in a predetermined position, and wherein n is less than N or M.

10. A device as claimed in claim 9 wherein said operating means comprises a focussing network for selectively coupling in phase signals and phase-opposition signals to selected columns or rows of said mosaic of transducers in accordance with a predetermined focussing diagram so that an ultrasonic beam is focussed on a line parallel to said columns or rows and intersects said line focus.

11. A device as claimed in claim 10 wherein said focussing network comprises first and second digital shift registers for storing the positive and negative images, respectively, of said predetermined focussing diagram, and a logic network controlled by said shift registers for selectively coupling said in phase signals and said phase-opposition signals to selected columns or rows of transducers as determined by the information in the shift registers.

12. A device as claimed in claim 10 wherein said prepolarization signal applying means comprises first and second digital shift registers for storing the positive and negative images, respectively, of a predetermined prepolarization diagram for the mosaic of transducers, and a logic network controlled by said shift registers for selectively coupling first and second prepolarazation signals to selected rows or columns of transducers as determined by the information in the shift registers.

13. A device as claimed in claim 9 wherein the transducer material is selected from the group consisting of ferroelectric, piezoelectric and electrostrictive materials.

14. A device as claimed in claim 9 wherein the transducer material is selected from the group consisting of monocrystalline triglycine sulphate and triglycine selenate or a monocrystalline mixture thereof.

* * * * *

UNITED STATES PATENT AND TRADEMARK OFFICE
CERTIFICATE OF CORRECTION

PATENT NO. : 4,112,411
DATED : September 5, 1978
INVENTOR(S) : PIERRE MICHEL ALAIS ET AL It is certified that error appears in the above-identified patent and that said Letters Patent are hereby corrected as shown below:

IN THE CLAIMS

Claim 1, line 17, change "and" to read --or--;

Signed and Sealed this

Twelfth Day of June 1979

[SEAL]

Attest:

RUTH C. MASON
Attesting Officer

DONALD W. BANNER
Commissioner of Patents and Trademarks